United States Patent
Matsui et al.

[15] 3,683,784
[45] Aug. 15, 1972

[54] AIR CONDITIONER FOR VEHICLES

[72] Inventors: Toshiji Matsui; Yasuhiko Amano; Yoshitsugu Hotta; Tsutomu Mitabe, all of Toyota, Japan

[73] Assignee: Toyota Jidosha Kogyo Kabushiki Kaisha, Toyotacho, Toyota-shi, Japan

[22] Filed: Oct. 13, 1970

[21] Appl. No.: 80,278

[30] Foreign Application Priority Data
May 16, 1970 Japan .......................45/47411

[52] U.S. Cl. ..............................98/2.08, 237/12.3 A
[51] Int. Cl. ................................B60h 1/02
[58] Field of Search ............98/2, 2.08, 2.09; 165/41; 237/12.3 A

[56] References Cited

UNITED STATES PATENTS

| | | |
|---|---|---|
| 2,295,146 | 9/1942 | Welch ........................98/2.08 |
| 2,430,759 | 11/1947 | Crise .........................98/2.08 |
| 2,837,288 | 6/1958 | Owen et al............237/12.3 A |
| 2,963,954 | 12/1960 | Baker......................165/41 X |
| 3,170,509 | 2/1965 | De Rees et al........237/12.3 A |
| 3,451,469 | 6/1969 | Hall et al....................98/2.08 |

Primary Examiner—William F. O'Dea
Assistant Examiner—P. D. Ferguson
Attorney—Cushman, Darby & Cushman

[57] ABSTRACT

An air conditioner for vehicles having a single vacuum diaphragm with which the driver can open and close a defroster outlet for blowing warm air on the windshield of the vehicle, a central outlet through which to blow suitably heated air or cold air into the middle space of the passenger compartment, or a heater outlet for blowing heated air into the lower space of the same compartment, because the vacuum diaphragm makes it possible to set the dampers for the three outlets simultaneously in three different positions and ensure unabated stability in positioning even when the diaphragm is in the neutral position.

4 Claims, 7 Drawing Figures

PATENTED AUG 15 1972

INVENTORS
TOSHIJI MATSUI
YASUHIKO AMANO
YOSHITSUGU HOTTA
TSUTOMU MITABE

BY Cushman, Darby & Cushman
ATTORNEYS

INVENTORS
TOSHIJI MATSUI
YASUHIKO AMANO
YOSHITSUGU HOTTA
TSUTOMU MITABE

BY Cushman, Darby & Cushman
ATTORNEYS

AIR CONDITIONER FOR VEHICLES

BACKGROUND OF THE INVENTION

This invention relates to an air conditioner for vehicles.

In order to have three air outlets of an air conditioning system separately opened or closed, at the same time, with a single vacuum diaphragm, it is necessary that the three positions be set by the diaphragm. When a diaphragm device as shown in FIG. 4 is employed, the three positions are dictated by the pressure difference between the two chambers 28, 29 which are defined by the diaphragm. The positioning is instable and inaccurate, however, particularly when there exists no such pressure difference. An attempt has been made to stabilize the positioning function of the diaphragm with the aid of two springs as in FIG. 5. The arrangement again has a drawback in that a minor inequality in the spring forces can lead to a general deviation in the positions or undesired shifting in positions due to vibrations, etc. These have been the problems of conventional vacuum diaphragm-controlled air conditioning units.

SUMMARY OF THE INVENTION

The present invention pertains to an air conditioner for vehicles comprising a car heater and ducts leading to three outlets, i.e., a defroster outlet for blowing warm air on the windshield, a central outlet for blowing suitably heated air or cold air to the middle space of the passenger compartment, and a heater outlet for blowing warm air to the lower space of the same compartment, and a single vacuum diaphragm with which the three outlets are opened or closed selectively at the same time.

According to this invention, an air conditioner for vehicle is provided wherein the positions of dampers to open or close the three air outlets can be fixed in three different states by a common vacuum diaphragm and highly stabilized positioning is attained as well when the diaphragm is in the neutral position.

DETAILED DESCRIPTION OF THE INVENTION

Figure 1:
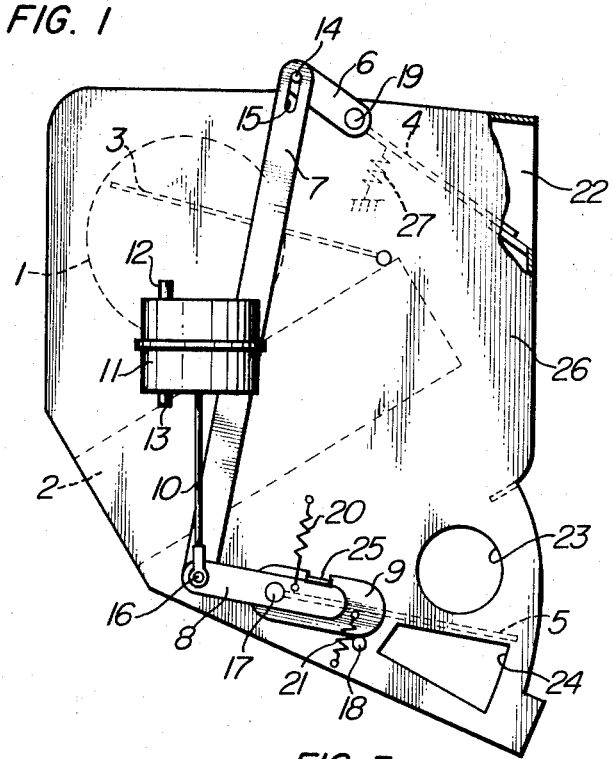
FIG. 1 is a diagrammatic side view of an air conditioner for vehicles according to this invention.

The air conditioner according to this invention will be described in detail hereunder with reference to the accompanying drawings.

Numeral 1 indicates an intake of air from a fan not shown, 2 indicates a heat exchanger through which hot water is circulated to heat the surrounding air, and 3 indicates a temperature-controlling damper. An air outlet 22 represents a central outlet through which suitably heated air or cold air is blown into the middle of the passenger compartment, and the amount of air that is blown out of this outlet is controlled by means of a damper 4. Outlets 23, 24, which are opened or closed by a damper 5, serve, respectively, as a defroster outlet through which warm air is blown on the windshield and a heater outlet through which heated air is blown into the lower space of the passenger compartment. The dampers 4, 5 are pivotally connected to the heater unit with pins 19, 17, which, in turn, fixedly support one ends of levers 6, 8, respectively. The other end of the lever 6 carries a pin 14, which fits in a slot 15 of a link 7. A vacuum diaphragm device 11 has vacuum inlets 12, 13 and a rod 10. The rod 10 and the link 7 are pivotally supported, together with a lever 8, jointly by a pin 16. A lever 9 is pivoted with a pin 17 and is formed with a stopper 25 to engage with the lever 8. A pin 18 serves as a stopper for the lever 9 which is secured to the heater body 26. Springs 20 and 21 are fixed to the heater body 26 and the lever 8, at one ends, and to the heater body 26 and the lever 9, at the other ends. To the vacuum inlets 12, 13 are connected vacuum hoses. The both ends of a spring 27 are fixed to the damper 4 and the heater body.

Figure 2:
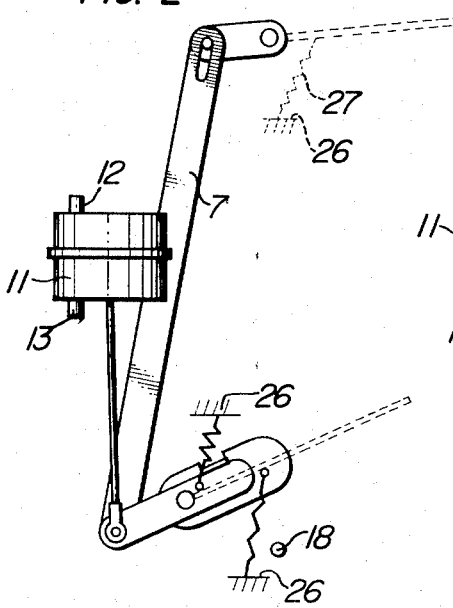
FIGS. 2 and 3 are similar views of the linkage of FIG. 1 in different operating conditions.
Figure 3:
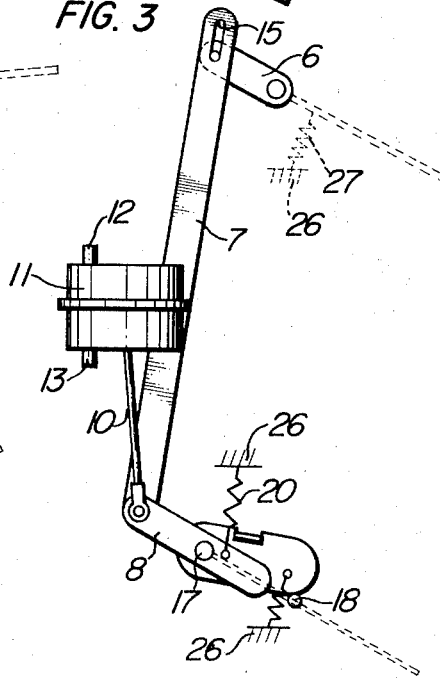
Figure 4:
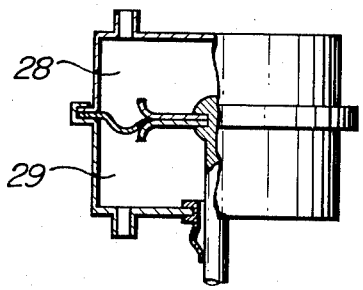
FIG. 4 is a partly sectional view of a vacuum diaphragm.
Figure 7:
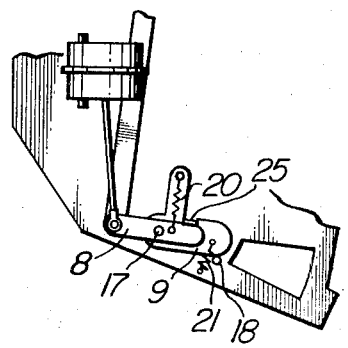
FIG. 7 is a view of a modified embodiment of the invention.

One end of the spring 20 may be fixed to the lever 9 instead of the heater body 26 (as shown in FIG. 7). its FIG. 1 shows the arrangement according to the invention in which the vacuum diaphragm device 11 is not evacuated through the ports 12, 13 and the outlet 22 is closed by the damper 4 and the outlet 24 by the damper 5, so that the air admitted into the unit from 1 is blown out through the outlet 23. Now if vacuum is admitted through the inlet 13 into one of the chambers of the vacuum diaphragm device 11 by a vacuum switch or other suitable means while leaving the other chamber open to the atmosphere through the inlet 12, a pressure difference will be produced between the two chambers defined by the vacuum diaphragm, with the result that the rod 10 will be urged downward and the lever 8 turned about the pin 17. Accordingly, the damper 5 fixed to the pin 17 will be turned to keep air from being blown out of the outlet 23. The lever 9, restricted in its motion by the stopper 25, will also be turned together with the lever 8. On the other hand, the link 7 will be turned downward by the descent of the lever 8, and this will be accompanied by the downward movement of the lever 6. Due to the turning of the levers 8, 6 as above described, the dampers 4, 5 will be moved to permit air to be blown out only through the outlet 22, in the state as illustrated in FIG. 2. Then, if the atmospheric pressure is introduced into the other chamber of the vacuum diaphragm device 11 contiguous to the vacuum inlet 13, the pressure difference between the two chambers of the diaphragm device 11 will be reduced to zero and the force with which the rod 10 is urged downward will be lost. As a result, the lever 8 will be brought back to the state as shown in FIG. 1 by the difference between the forces of springs 21, 27 and the spring 20. FIG. 3 shows the vacuum diaphragm device with the chamber contiguous to the vacuum inlet 12 evacuated. The rod 10 is thus urged upward and the lever 8 is, accordingly, turned clockwise. At this time, the link 7 is moved upward, too, but the lever 6 is kept from moving as it is confined within the slot 15. In this state, the damper 4 remains in the state shown in FIG. 1 and the outlet 22 is kept closed. The damper 5 is moved to the lowermost point, and the outlets 23, 24 are opened, with the consequence that warm air is blown against the windshield and into the leg space of the passenger compartment. Here if the vacuum inlet 12 is communicated to the atmosphere, the state shown in FIG. 1 will be assumed by dint of the spring 20.

Figure 5:
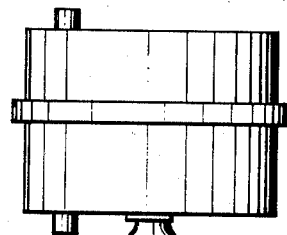
FIG. 5 is a view of an ordinary vacuum diaphragm as equipped with springs.
Figure 6:
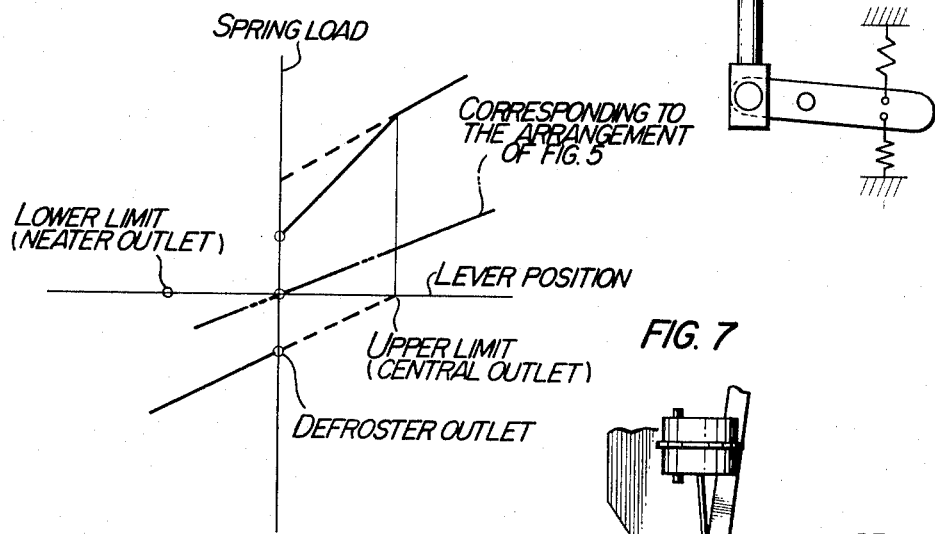
FIG. 6 is a graph illustrating the relationship between the lever position and actuating force.

The spring load of the air conditioner according to the invention is plotted on the axis of ordinates against the driving lever position on the axis of abscissas in the graph of FIG. 6. In the state where the vacuum diaphragm device is not evacuated, i.e., where heated air is blown out from the defroster outlet, there is no need of actuating force. But if the position deviates a little, much actuating force will be required. It will be seen that, as compared with a conventional arrangement shown in FIG. 5, stabilized positions can be maintained by the conditioner of the invention even when vacuum is not admitted to the vacuum diaphragm device.

Thus, in accordance with this invention, changes in the conditions of the three outlets, i.e., the defroster outlet, central outlet and heater outlet, can be controlled by a single vacuum diaphragm device and, therefore, the air conditioner can be manufactured at accordingly reduced cost.

Usually, in an air conditioner of the type described, the driving lever is driven with a wire. In the apparatus of the invention, by contrast, the lever is driven by switching the vacuum device to the ON or OFF position. The latter is simpler to handle. Also, for example, on the operating panel of a conventional car heater, there are at least two wire-driving levers, i.e., a temperature control lever and an outlet change-over lever. In conformity with the present invention, one of the levers or the outlet change-over lever can be dispensed with as the vacuum switch is incorporated in the temperature control lever.

What is claimed is:

1. A ventilating unit for a vehicle comprising:

a casing provided with an inlet for introducing ventilating air into said casing and three outlet openings for supplying the air to three different portions of the vehicles;

a first damper for opening and closing a first of said three outlet openings, said first damper being rigidly connected to one end of a first lever so that said first damper and lever are rotatable in unison about a first pivot, mounted on the casing, located adjacent said one end of the lever;

a second damper for opening and closing second and third outlet openings, said second damper being rigidly connected to one end of a second lever so that said second damper and said second lever are rotatable in unison about a second pivot mounted on the casing;

a connecting rod pivotally connected at one end thereof to the other end of said first lever through an elongated slot provided at said one end of the rod and a pin provided at said other end of the lever, and pivotally connected at the other end thereof to an end of said second lever;

damper activating means operatively connected to said connecting rod for displacing the same;

a first spring means for urging said first damper toward one direction about the first pivot and a second spring means for urging said second damper toward such direction about said second pivot as to apply to the connecting rod a force displacing the rod in the direction opposite to the direction of the displacement by the influence of said first spring;

whereby the ventilating unit is stabilized in a neutral position in which the first and the third openings are closed and the second opening is open, and when the rod is moved by said activating means to a first position from said neutral position, the movement of the rod causes said second lever to turn about the pivot to the position opening both the second and third openings, but due to the elongated slot on the connecting rod the movement of this rod does not cause the first lever to turn about the first pivot, thus retaining the first opening in a closed position, and when the rod is moved to a second position opposite to the first position the movement of the rod causes both of the first and the second levers to turn about their respective pivots to the positions in which the first opening is opened and the second and the third openings are both closed.

2. A ventilating unit as defined in claim 1, which further comprises:

a third lever having a lug mounted on one side thereof and adapted to engage the edge of said second lever, one end of said third lever being pivotally mounted on the second pivot and a stopper pin adapted to engage the other end of the third lever on the side opposite said lug so that when the rod is moved to said first position the third lever remains in rest position, but when the rod is moved to said second position the lug engages the second lever and the third lever is pivoted together with the second lever;

and third spring means connected to other end of the third lever for stabilizing the same in a neutral position in cooperation with said second spring means when the rod is in said neutral position.

3. A ventilating unit as defined in claim 1 in which said second spring means for elastically urging the second damper is fixed at one end to said second lever and at the opposite end to said casing.

4. A ventilating unit as defined in claim 1 in which said second spring means for elastically urging the second damper is fixed at one end on said second lever and at the opposite end on said third lever.

* * * * *